US009363413B2

(12) United States Patent
Saitoh et al.

(10) Patent No.: US 9,363,413 B2
(45) Date of Patent: Jun. 7, 2016

(54) INFORMATION PROCESSING APPARATUS, INFORMATION PROCESSING METHOD AND RECORDING MEDIUM FOR DISTINGUISHING HANDWRITTEN TEXT APPLIED TO A PRINTED DOCUMENT

(71) Applicants: Yuuta Saitoh, Tokyo (JP); Yuichi Noda, Kanagawa (JP); Hidenori Shindoh, Tokyo (JP)

(72) Inventors: Yuuta Saitoh, Tokyo (JP); Yuichi Noda, Kanagawa (JP); Hidenori Shindoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/724,386

(22) Filed: May 28, 2015

(65) Prior Publication Data
US 2015/0356761 A1    Dec. 10, 2015

(30) Foreign Application Priority Data

Jun. 9, 2014 (JP) ................................. 2014-118954
Jan. 19, 2015 (JP) ................................. 2015-007940

(51) Int. Cl.
| | |
|---|---|
| *H04N 1/387* | (2006.01) |
| *G06T 11/60* | (2006.01) |
| *G06K 9/00* | (2006.01) |
| *G06K 9/62* | (2006.01) |
| *G06K 15/02* | (2006.01) |
| *H04N 1/00* | (2006.01) |
| *G06K 9/34* | (2006.01) |
| *G06K 9/68* | (2006.01) |

(52) U.S. Cl.
CPC ............ *H04N 1/387* (2013.01); *G06K 9/00456* (2013.01); *G06K 9/344* (2013.01); *G06K 9/6835* (2013.01); *G06K 15/1882* (2013.01); *G06T 11/60* (2013.01); *H04N 1/00331* (2013.01); *H04N 1/00352* (2013.01); *H04N 1/00482* (2013.01); *G06K 2209/01* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,910,787 A | * | 3/1990 | Umeda ................ | G06K 9/6835 382/173 |
| 5,402,504 A | * | 3/1995 | Bloomberg .......... | G06K 9/6835 382/175 |
| 6,909,805 B2 | * | 6/2005 | Ma ..................... | G06K 9/00456 382/170 |

(Continued)

FOREIGN PATENT DOCUMENTS

| | | |
|---|---|---|
| JP | H01-147948 | 6/1989 |
| JP | 11265424 A * | 9/1999 |
| JP | 2006-196976 | 7/2006 |

*Primary Examiner* — Scott A Rogers
(74) *Attorney, Agent, or Firm* — Duft Bornsen & Fettig LLP

(57) ABSTRACT

An information processing apparatus for converting image data created from an optically read manuscript to character data is provided. The information processing apparatus includes a data converting unit configured to convert the image data of a printed character printed beforehand on the manuscript and an added character added after the printed character has been printed to the character data; a character data distinguishing unit configured to distinguish, of the converted character data, between printed character data converted from the image data corresponding to the printed character and added character data converted from the image data corresponding to the added character; an edit information accepting unit configured to accept added character data edit information; and a character data edit unit configured to edit, according to the accepted added character data edit information, the distinguished added character data.

6 Claims, 10 Drawing Sheets

(56) References Cited

U.S. PATENT DOCUMENTS

| | | | | |
|---|---|---|---|---|
| 7,149,352 B2* | 12/2006 | Fujiwara | G06K 9/00456 | 382/181 |
| 7,327,883 B2* | 2/2008 | Polonowski | G06K 9/6272 | 382/182 |
| 7,372,993 B2* | 5/2008 | Lagardere | G06F 3/04883 | 382/186 |
| 7,469,063 B2* | 12/2008 | Koyama | G06K 9/00456 | 358/474 |
| 7,561,289 B2* | 7/2009 | Talley | G06F 17/24 | 358/1.11 |
| 7,991,231 B2* | 8/2011 | Kimura | G06K 9/00456 | 382/108 |
| 8,515,175 B2* | 8/2013 | Ozawa | G06K 9/00463 | 382/185 |
| 9,025,879 B2* | 5/2015 | Sugiura | G06K 9/00416 | 382/181 |
| 2006/0062459 A1* | 3/2006 | Saito | G06K 9/6835 | 382/181 |
| 2007/0211946 A1* | 9/2007 | Kimura | G06K 9/00456 | 382/199 |
| 2015/0067485 A1* | 3/2015 | Kim | G06F 17/2264 | 715/256 |

* cited by examiner

FIG.7

EDIT TEXT

HANDWRITTEN CHARACTERS ARE INCLUDED.
CHARACTERS CAN BE EDITED BY SELECTING AREA SURROUNDED
BY DOTTED LINE.

| FONT | FONT SIZE | FONT COLOR | CHARACTER ORIENTATION |
|---|---|---|---|
| MSP GOTHIC ⌄ | 12 ⌄ | A ⌄ | HORIZONTAL WRITING ⌄ |
| FRAME LINE COLOR | FRAME LINE STYLE (SOLID LINE/ DOTTED LINE) | BACKGROUND COLOR | CHARACTER STYLE (BOLD/ITALIC/ UNDERLINE) |
| WITHOUT FRAME LINE ⌄ | ——— ⌄ | SAME AS ORIGINAL MANUSCRIPT ⌄ | BOLD ITALIC ⌄ |

⌞A B Q D E Z⌟

ABCDEFGHIJKLMNOPQR

STUVWXYZ ⌞G H X J⌟

ABCDEFGHIJKLMNOPQRST

UVWXYZ

⌞V T M N O R⌟

ABCDEFGHIJKLMNOPQRSTUV

WXYZ

OK    CANCEL EDIT

INFORMATION PROCESSING APPARATUS, INFORMATION PROCESSING METHOD AND RECORDING MEDIUM FOR DISTINGUISHING HANDWRITTEN TEXT APPLIED TO A PRINTED DOCUMENT

CROSS-REFERENCE TO RELATED APPLICATIONS

The present application is based on and claims the benefit of priority of Japanese Priority Application No. 2014-118954 filed on Jun. 9, 2014, and Japanese Priority Application No. 2015-007940 filed on Jan. 19, 2015, the entire contents of which are hereby incorporated herein by reference.

BACKGROUND OF THE INVENTION

1. Field of the Invention

The present invention relates to an information processing apparatus, an information processing method, and a recording medium.

2. Description of the Related Art

In recent years, it is a trend to promote information digitization, and accordingly, a scanner used for digitizing a manuscript has become indispensable equipment. The manuscript digitized by a scanner (hereinafter, referred to "digitized data") is utilized by an image forming apparatus, etc., by being output onto a recording medium, if necessary, or by being transmitted to an information processing terminal such as a PC (Personal Computer) via a network.

At this time, sometimes, handwritten characters are added to the manuscript which is ready to be digitized. In such a case, the manuscript which is ready to be digitized includes a mix of characters created and printed beforehand by word-processing software, or the like (hereinafter, "document characters"), and handwritten characters added afterwards (hereinafter, "handwritten characters"). As a result, the manuscript to which handwritten characters are added (hereinafter, "added manuscript") has a bad appearance in which difference between the document characters and the handwritten characters stands out, which bad appearance remains even if the manuscript is digitized.

Therefore, an information processing apparatus is known in which characters included in image data, which are digitized data of the added manuscript, are recognized as characters by using OCR (Optical Character Recognition) and converted to character data whose format can be processed by the information processing apparatus (refer to, for example, Patent Document 1).

[Patent Document 1] Japanese Laid-Open Patent Application No. 2006-196976

SUMMARY OF THE INVENTION

However, while OCR in such an information processing apparatus can accurately recognize a character such as a document character whose shape is neat, it may falsely recognize a character such as a handwritten character whose shape is not neat, and may convert to a wrong character. This kind of false conversion occurs frequently for a character such as a handwritten character whose shape is not neat, but it may also occur for a character such as a document character whose shape is neat.

An object of an aspect of the present invention includes providing an information processing apparatus which can edit characters of a manuscript to which handwritten characters have been added to desired character data.

In one aspect, an information processing apparatus for converting image data created from an optically read manuscript to character data is provided. The information processing apparatus includes a data converting unit configured to convert the image data of a printed character printed beforehand on the manuscript and an added character added after the printed character has been printed to the character data, a character data distinguishing unit configured to distinguish, of the converted character data, between printed character data which are the character data converted from the image data corresponding to the printed character and added character data which are the character data converted from the image data corresponding to the added character, an edit information accepting unit configured to accept added character data edit information for editing the distinguished added character data, and a character data edit unit configured to, according to the accepted added character data edit information, edit the distinguished added character data.

According to the present invention, when digitizing an added manuscript, characters of the manuscript in which handwritten characters have been added can be edited to desired character data.

BRIEF DESCRIPTION OF THE DRAWINGS

FIG. 7 is a drawing illustrating a display example of a text edit screen according to an embodiment of the present invention.

DETAILED DESCRIPTION OF THE PREFERRED EMBODIMENTS

Figure 1:
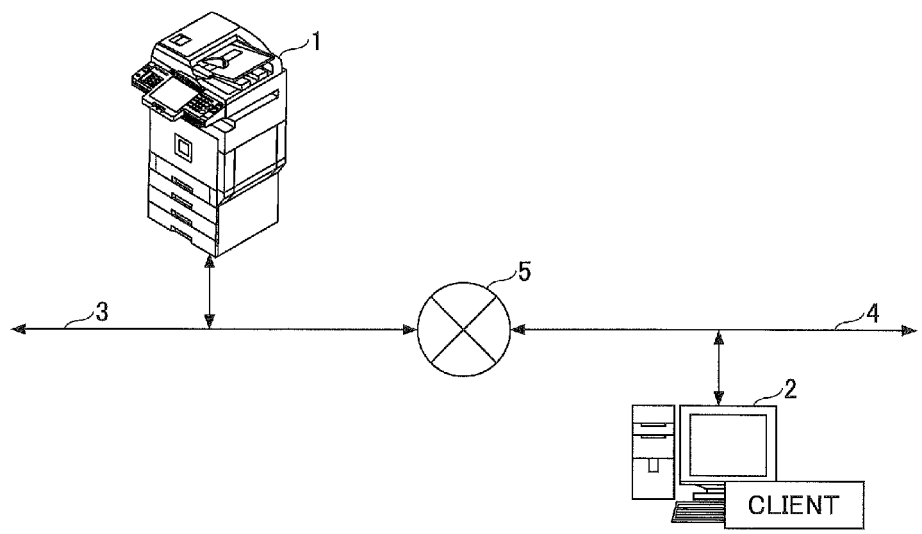
FIG. 1 is a drawing illustrating an example of an operational embodiment of an image forming system according to an embodiment of the present invention.

In the following, referring to the drawings, embodiments of the present invention will be described in detail. In the present embodiment, as an example of an image forming system, an image forming system will be described, in which an image forming apparatus including a scanner for digitizing a manuscript and a client terminal operated by a user are connected via a network. In other words, an information processing apparatus according to an embodiment of the present invention is, for example, the client terminal. In the following, an example in which the information processing apparatus is the client terminal will be described. It should be noted that the information processing apparatus may be an image processing apparatus such as an image forming apparatus.

In such an image forming system, an image forming apparatus according to the present embodiment, in order to digitize a manuscript, reads the manuscript by using a scanner, creates image data as digitized data of the manuscript, and stores the image data in a non-volatile storage medium. Further, the image forming apparatus transmits the image data to the client terminal via the network if necessary. In this case, sometimes, handwritten characters may be added to the manuscript which is ready to be digitized by the image forming apparatus according to the present embodiment.

As a result, the manuscript which is ready to be digitized by the image forming apparatus according to the present embodiment includes a mix of characters created and printed beforehand by word-processing software, or the like (hereinafter, "document characters"), and handwritten characters added afterwards (hereinafter, "handwritten characters"). Therefore, the manuscript to which handwritten characters are added (hereinafter, "added manuscript") has a bad appearance in which difference between the document characters and the handwritten characters stands out, which bad appearance remains even if the manuscript is digitized.

So, the client terminal according to the present embodiment recognizes characters included in image data which are digitized data of the added manuscript which has been transmitted from the image forming apparatus via a network, or which has been input by another method and created by the image forming apparatus. Specifically, the client terminal is configured to recognize characters included in the image data by using OCR, and converts them to character data whose format can be processed by the information processing apparatus.

However, in general, while OCR can accurately recognize a character such as a document character whose shape is neat, it may falsely recognize a character such as a handwritten character whose shape is not neat. As a result, if a falsely recognized character is directly converted to character data, it will be converted to a wrong character.

Therefore, a client terminal according to the present embodiment is configured to, after converting characters included in image data which are data of the added manuscript digitized by using OCR, extract, from the converted character data, character data corresponding to handwritten characters (hereinafter, "handwritten texts") so that the extracted handwritten texts can be freely edited by a user. Therefore, according to the client terminal of the present embodiment, even in the case where handwritten characters are incorrectly converted as a result of false recognition by the OCR, it is possible for a user to freely edit the incorrectly converted handwritten texts. Therefore, in the client terminal according to the present embodiment, when digitizing the added manuscript, it is possible for a user to edit the handwritten characters to be desired character data.

It should be noted that, although an example is described in which the client terminal according to the present embodiment is configured to edit the handwritten texts, it may also be configured to be able to edit the character data corresponding to the document characters (hereinafter, "document texts").

First, referring to FIG. 1, an operational embodiment of an image forming system according to the present embodiment will be described. In other words, FIG. 1 is a drawing illustrating an example of an operational embodiment of an image forming system according to the present embodiment. For example, as shown in FIG. 1, the image forming system according to the present embodiment includes a network 3 to which an image forming apparatus 1 is connected and a network 4 to which a client terminal 2 is connected, the network 3 and the network 4 being connected to each other via a public line 5 such as the Internet or a telephone line.

It should be noted that the number of the client terminals 2 connected to the network 4 is just an example and more client terminals 2 may be connected and the scale of the system may be larger. Also, it should be noted that the system may include multiple different networks to which multiple different client terminals 2 are connected, and the different networks may be connected to each other via the public line 5, or the image forming apparatus 1 and the client terminal 2 may be connected to the same network.

The image forming apparatus 1 is an MFP (Multi Function Peripheral) which can be used as a printer, a facsimile machine, a scanner, or a copy machine by including an imaging function, an image forming function, a communications function or the like. Also, the image forming apparatus creates drawing data of CMYK (Cyan Magenta Yellow Black (Key Plate)) or monochrome based on image data included in a print job transmitted from the client terminal 2. Also, the image forming apparatus 1 includes functions of a color printer and a monochrome printer to form and output an image onto a fed paper based on the created drawing data.

The client terminal 2 is a PC, or the like, which a user operates. It should be noted that the client terminal 2 may be realized by a mobile information terminal such as a PDA (Personal Digital Assistant), a smartphone, or a tablet terminal. Also, in the client terminal 2 according to the present embodiment, a printer driver is installed, which is dedicated software for using the image forming apparatus 1.

It should be noted that the networks 3 and 4 in FIG. 1 are, for example, restricted networks such as an office LAN (Local Area Network). In FIG. 1, although the image forming apparatus 1 and the client terminal 2 are connected to the public line 5 via respective LANs, the image forming apparatus 1 and the client terminal 2 may be directly connected to the public line 5.

Figure 2:
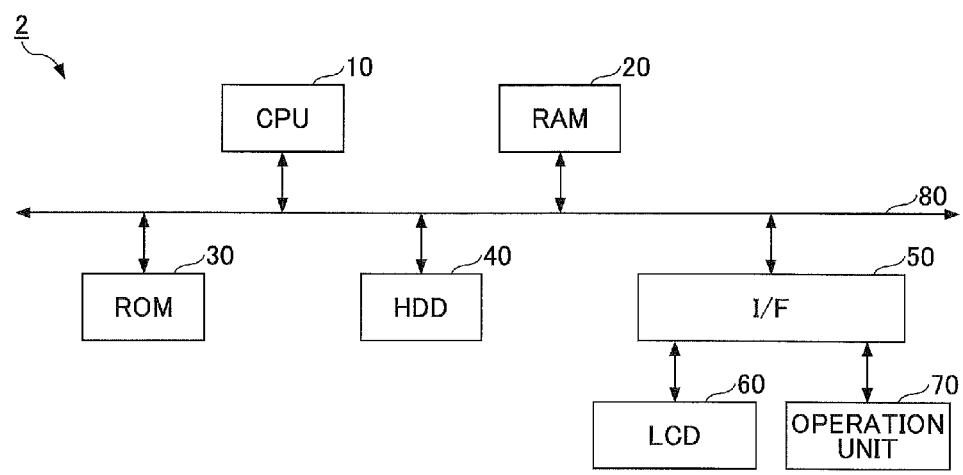
FIG. 2 is a schematic block diagram of an example of a hardware configuration of an image forming apparatus according to an embodiment of the present invention.

Next, referring to FIG. 2, hardware configurations of the image forming apparatus 1 and the client terminal 2 according to the present embodiment will be described. In other words, FIG. 2 is a schematic block diagram of an example of a hardware configuration of an image forming apparatus 1 according to the present embodiment. It should be noted that, in FIG. 2, a hardware configuration of the image forming apparatus 1 is described as an example, and the same will be applied to the client terminal 2. Also, the image forming apparatus 1 includes, in addition to the hardware configuration shown in FIG. 2, hardware for implementing dedicated functions in a printer, a scanner and a facsimile.

As shown in FIG. 2, the client terminal 2 according to the present embodiment includes the same configuration as a typical server, a PC, or the like. In other words, in the client terminal 2, a CPU (Central Processing Unit) 10, a RAM (Random Access Memory) 20, a ROM (Read Only Memory) 30, an HDD (Hard Disk Drive) 40, and an I/F (interface) 50 are connected via a bus 80. Also, to the I/F 50, an LCD (Liquid Crystal Display) 60 and an operation unit 70 are connected.

The CPU 10 is a computing means and controls overall operations of the client terminal 2. Also, the RAM 20 is a volatile storage medium which is capable of fast information reading and writing. Further, the ROM 30 is a read-only non-volatile storage medium in which programs such as firmware are stored. Furthermore, the HDD 40 is a non-volatile storage medium which is capable of fast information reading and writing and in which an OS (Operating System), various control programs, application programs, or the like, are stored.

The I/F 50 connects and controls the bus 80, various kinds of hardware, networks, and the like. Also, the LCD 60 is a visual user interface for a user to check the state of the client terminal 2, which is realized by a display apparatus such as an LCD. Further, the operation unit 70 is a keyboard, a mouse, or the like, which is a user interface for a user to input information to the client terminal 2.

In this hardware configuration, the programs stored in a storage medium such as the ROM 30, the HDD 40, or an optical disk are loaded into the RAM 20. Then, a software control unit is realized by the CPU 10 performing computation according to the programs loaded on the RAM 20. As a result, in the present embodiment, a part or all of the above programs function as a data format converting program. Function blocks which realize functions of the client terminal 2 according to the present embodiment are realized by a combination of hardware and the software control unit described above.

Figure 3:
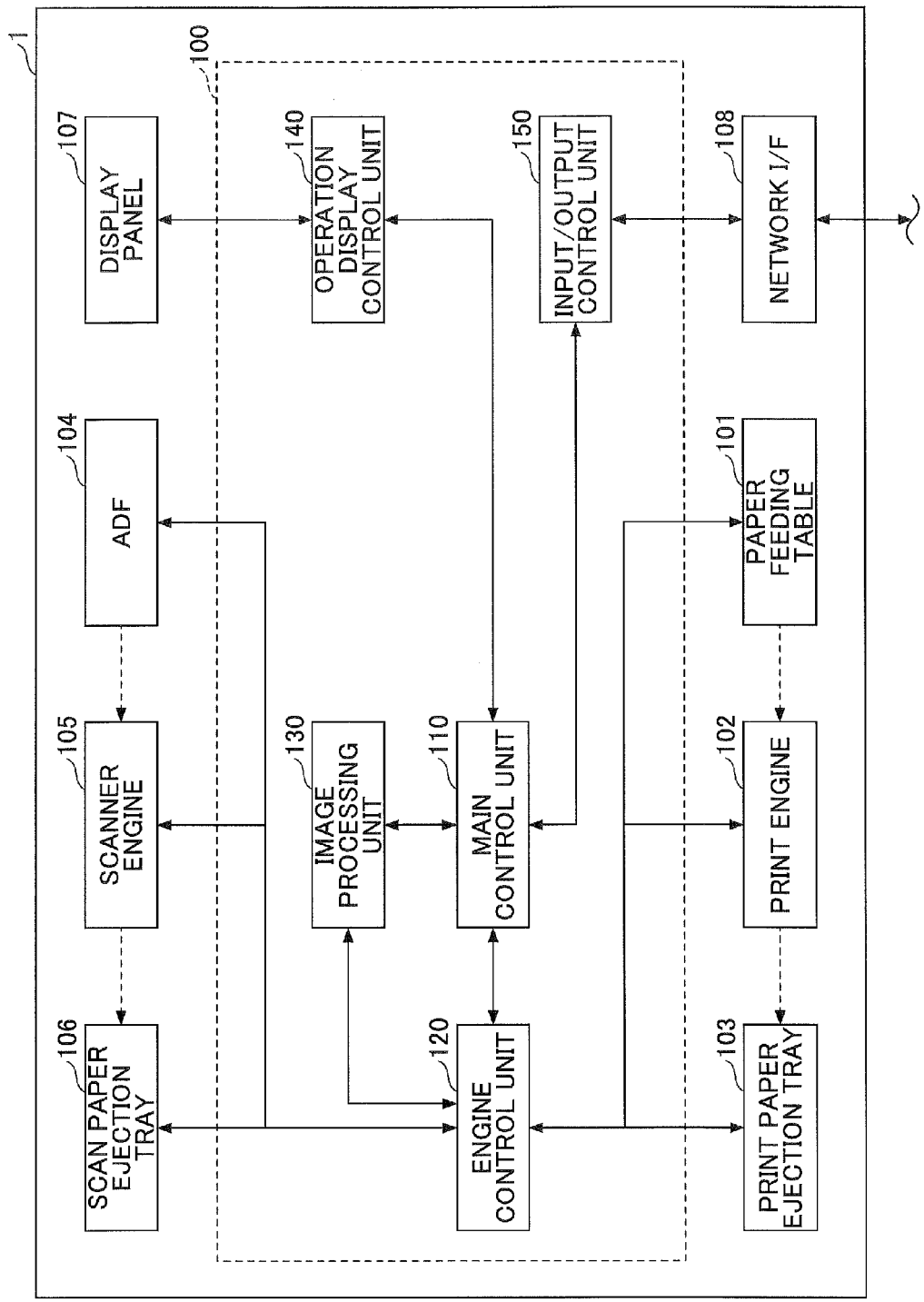
FIG. 3 is a schematic block diagram of an example of a functional configuration of an image forming apparatus according to an embodiment of the present invention.

Next, referring to FIG. 3, a functional configuration of the image forming apparatus 1 according to the present embodiment will be described. In other words, FIG. 3 is a schematic block diagram of an example of a functional configuration of the image forming apparatus 1 according to the present embodiment. It should be noted that, in FIG. 3, an electrical connection is indicated by a solid-line arrow, and a flow of transfer sheets or a document bundle is indicated by a dashed-line arrow.

As shown in FIG. 3, the image forming apparatus 1 according to the present embodiment includes a controller 100, a paper feeding table 101, a print engine 102, a print paper ejection tray 103, an ADF (Auto Document Feeder) 104, a scanner engine 105, a scan paper ejection tray 106, a display panel 107 and a network I/F 108. Also, the controller 100 includes a main control unit 110, an engine control unit 120, an image processing unit 130, an operation display control unit 140, and an input/output control unit 150.

The paper feeding table 101 feeds a transfer sheet to the print engine 102 as an image forming unit. The print engine 102 is the image forming unit which draws an image by forming and outputting the image onto the transfer sheet conveyed from the paper feeding table 101. A specific embodiment of the print engine 102 is an image forming mechanism using an electrophotography method. The transfer sheet on which the image has been formed and output by the print engine 102 is ejected to the print paper ejection tray 103.

The ADF 104 automatically conveys a manuscript to the scanner engine 105 as a manuscript reading unit. Also, the scanner engine 105 is a manuscript reading unit including a photoelectric conversion element which converts optical information to an electrical signal. In other words, the scanner engine 105 is a manuscript reading unit which optically scans and reads a manuscript automatically conveyed by the ADF 104 or a manuscript set on a platen and creates imaging data. The manuscript, automatically conveyed by the ADF 104 and scanned and read by the scanner engine 105, is ejected to the scan paper ejection tray 106. Also, printed characters printed on the manuscript and added characters added afterwards are optically read by the scanner engine 105, or the like.

The display panel 107 is, not only an output interface for visually displaying the state of the image forming apparatus 1, but also an input interface as a touch panel for a user to directly control the image forming apparatus 1 or to input information for the image forming apparatus 1. In other words, the display panel 107 includes a function for displaying an image for accepting an operation by the user. It should be noted that the display panel 107 is realized by the LCD 60 and the operation unit 70 shown in FIG. 2.

The network I/F 108 is an interface for the image forming apparatus to communicate with other equipment such as a terminal or a PC for an administrator via a network. Specifically, as the network I/F 108, an interface such as Ethernet (registered trademark), a USB (Universal Serial Bus) interface, Bluetooth (registered trademark), Wi-Fi (Wireless Fidelity) (registered trademark), or FeliCa (registered trademark) is used. In this way, the image forming apparatus 1 according to the present embodiment receives image data requested for printing and various kinds of control commands such as a print request from the connected terminal via the network I/F 108. It should be noted that the network I/F 108 is realized by the I/F 50 shown in FIG. 2.

The controller 100 is configured with a combination of software and hardware. Specifically, a control program such as firmware stored in a non-volatile storage medium such as the ROM 30 or the HDD 40 is loaded into the RAM 20. Then, the controller 100 is configured with a software control unit realized by the CPU 10 performing computation according to the loaded program and hardware such as integrated circuits. The controller 100 functions as a control unit for controlling overall operations of the image forming apparatus 1.

The main control unit 110 is responsible for controlling each unit included in the controller 100 and gives instructions to each unit. Also, the main control unit 110 controls the input/output control unit 150 and accesses other equipment via the network I/F 108 and the network. The engine control unit 120 controls or drives a drive unit such as the print engine 102, the scanner engine 105, or the like.

The image processing unit 130 creates, according to the control of the main control unit 110, image data described in PDL (Page Description Language), or the like, as output information. The image data are, for example, document data included in the input print job or drawing data based on the image data. The drawing data are information such as bitmap data of CMYK, which are information for drawing an image which should be formed by the image forming operation of the print engine 102 as an image forming unit.

Also, the image processing unit 130 processes data input from the scanner engine 105 and creates read image data. The read image data are information which are stored in the image forming apparatus 1 as a result of the scanning operation, or transmitted to the network I/F 108 and other equipment via the network.

The operation display control unit 140 displays information on the display panel 107 or transmits to the main control unit 110 information input via the display panel 107. Also, the input/output control unit 150 inputs to the main control unit 110 a signal and a command input via the network I/F 108 and the network.

Figure 4:
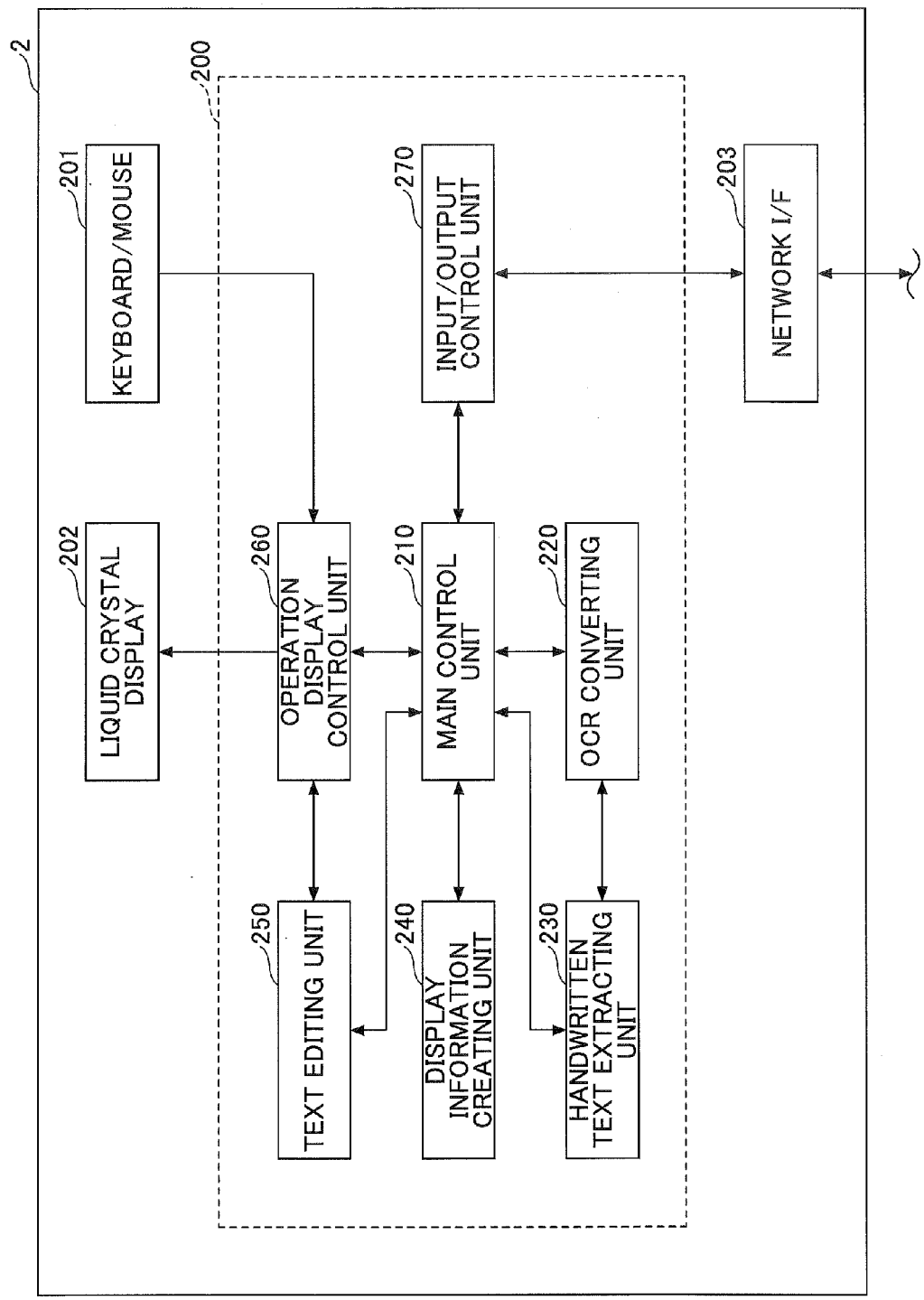
FIG. 4 is a schematic block diagram of an example of a functional configuration of a client terminal according to an embodiment of the present invention.

Next, referring to FIG. 4, a functional configuration of the client terminal 2 according to the present embodiment will be described. In other words, FIG. 4 is a schematic block diagram of an example of a functional configuration of the client terminal 2 according to the present embodiment. It should be noted that an electrical connection is indicated by a solid-line arrow.

As shown in FIG. 4, the client terminal 2 includes a controller 200, a keyboard/mouse 201, a liquid crystal display 202, and a network I/F 203. Also, the controller 200 includes a main control unit 210, an OCR converting unit 220, a handwritten text extracting unit 230, a display information creating unit 240, a text editing unit 250, an operation display control unit 260, and an input/output control unit 270.

The keyboard/mouse 201 is an input interface for a user to input information to the client terminal 2. It should be noted that the keyboard/mouse 201 is realized by the operation unit 70 shown in FIG. 2. Also, the liquid crystal display 202 is an output interface for visually displaying the state of the client terminal 2. It should be noted that the liquid crystal display 202 is realized by the LCD 60 shown in FIG. 2.

The network I/F 203 is an interface for the client terminal 2 to communicate with other equipment such as a terminal or a PC for an administrator via a network. Specifically, as the network I/F 203, an interface such as Ethernet (registered trademark), a USB interface, Bluetooth (registered trademark), Wi-Fi (registered trademark), or FeliCa (registered trademark) is used. In this way, the client terminal 2 according to the present embodiment, in order to request a print job to the image forming apparatus connected via the network I/F 203, transmits image data and various kinds of control commands such as a print request. It should be noted that the network I/F 203 is realized by the I/F 50 shown in FIG. 2.

The controller 200 is configured with a combination of software and hardware. Specifically, a control program such as firmware stored in a non-volatile storage medium such as the ROM 30 or the HDD 40 is loaded into the RAM 20. Then, the controller 200 is configured with a software control unit realized by the CPU 10 performing computation according to the loaded program and hardware such as integrated circuits. The controller 200 functions as a control unit for controlling overall operations of the client terminal 2.

The main control unit 210 is responsible for controlling each unit included in the controller 200 and gives instructions to each unit. Also, the main control unit 210 controls the input/output control unit 270 and accesses other equipment via the network I/F 203 and the network.

The OCR converting unit 220, according to the control of the main control unit 210, by using OCR, recognizes as characters the characters included in image data which are digitized data created by the image forming apparatus 1 by reading a manuscript, and converts them to character data. In the following, a process of converting the characters included in the image data to the character data by the OCR converting unit 220 is referred to as an "OCR converting process". It should be noted that a data converting unit is, for example, the OCR converting unit 220. In the following, an example will be described in which the data converting unit is the OCR converting unit 220.

The handwritten text extracting unit 230 extracts character data corresponding to handwritten characters (handwritten texts) from character data converted by the OCR converting unit 220. In the following, a process of extracting the handwritten texts by the handwritten text extracting unit 230 is referred to as a "handwritten text extracting process". It should be noted that a character data distinguishing unit is, for example, the handwritten text extracting unit 230. In the following, an example will be described in which the character data distinguishing unit is the handwritten text extracting unit 230.

At this time, the handwritten text extracting unit 230 compares manuscript data created by word-processing software, or the like, which are the base manuscript data of the manuscript to be digitized by the image forming apparatus 1, and digitized data of the added manuscript after the OCR converting process. Then, the handwritten text extracting unit 230, based on the comparison result, extracts character data in the digitized data of the difference as handwritten texts. Or, the handwritten text extracting unit 230, by comparing digitized data obtained by applying the OCR converting process to the digitized data of the manuscript to which added characters have not been added and digitized data obtained by applying the OCR converting process to the added manuscript, extracts character data in the digitized data of the difference as handwritten texts. Also, different from the above, the handwritten text extracting unit 230, in the OCR converting process, extracts characters, whose recognition rate is less than a predetermined value, as handwritten texts, and extracts characters, whose recognition rate is equal to or greater than the predetermined value, as document texts. In this way, the handwritten text extracting unit 230 distinguishes between the handwritten texts and the document texts by extracting the handwritten texts and the document texts separately from the character data in the digitized data.

The display information creating unit 240, according to the control of the main control unit 210, based on the extraction result by the handwritten text extracting unit 230, creates edit screen display information. It should be noted that the edit screen display information is information for displaying on the liquid crystal display 202 a text edit screen which is an interface for a user to edit the extracted handwritten texts. It should be noted that an input screen display information creating unit is, for example, the display information creating unit 240. In the following, an example will be described in which the input screen display information creating unit is the display information creating unit 240. Also, in the text edit screen, a user inputs edit information for editing the handwritten texts by operating the client terminal 2 via the keyboard/mouse 201. It should be noted that an edit information accepting unit is, for example, the keyboard/mouse 201. In the following, an example will be described in which the edit information accepting unit is the keyboard/mouse 201.

The text editing unit 250, according to the control of the main control unit 210, edits the handwritten texts based on the edit information input through the keyboard/mouse 201 in the text edit screen. In the following, a process of editing the handwritten texts by the text editing unit 250 is referred to as a text edit process. A text edit function provided by this text editing unit 250 is one of the subject matters according to the present embodiment. It should be noted that a character data edit unit is, for example, the text editing unit 250. In the following, an example will be described in which the character data edit unit is the text editing unit 250.

The operation display control unit 260 displays information on the liquid crystal display 202 or transmits to the main control unit 210 information input via the keyboard/mouse 201. Also, the input/output control unit 270 inputs to the main control unit 110 a signal and a command input via the network I/F 203 and the network.

In such an image forming system, the image forming apparatus 1 according to the present embodiment, in order to digitize a manuscript, reads the manuscript by using the scanner engine 105, and creates image data as digitized data of the manuscript. The image forming apparatus 1 is configured to store the created image data in a non-volatile storage medium such as an HDD 40, output the image data onto the recording medium if necessary, or transmit the image data to the client terminal via a network. In this case, sometimes, handwritten characters may be added to the manuscript which is ready to be digitized by the image forming apparatus 1 according to the present embodiment.

As a result, the manuscript which is ready to be digitized by the image forming apparatus 1 according to the present embodiment includes a mix of characters created and printed beforehand by word-processing software, or the like (document characters), and handwritten characters added afterwards (handwritten characters). As a result, the manuscript to which handwritten characters are added (added manuscript) has a bad appearance in which the difference between the document characters and the handwritten characters stands out, which bad appearance remains even if the manuscript is digitized.

Therefore, the client terminal 2 according to the present embodiment recognizes characters included in the image data as characters by using OCR, and converts to character data whose format can be processed by the information processing apparatus. It should be noted that the image data are digitized data of the added manuscript which have been transmitted from the image forming apparatus 1 via a network, or, which have been input by another method and have been created by the image forming apparatus 1.

However, in general, while OCR can accurately recognize a character such as a document character whose shape is neat, it may falsely recognize a character such as a handwritten character whose shape is not neat. As a result, if a falsely recognized character is directly converted to character data, it will be converted to a wrong character.

Therefore, the client terminal 2 according to the present embodiment is configured to extract handwritten texts from the digitized data of the added manuscript to which an OCR converting process has been applied, so that a user can freely edit the extracted handwritten texts. Therefore, according to the client terminal 2 of the present embodiment, even in the case where handwritten characters are falsely recognized by the OCR, it is possible for a user to freely edit the incorrectly converted handwritten texts. Therefore, in the client terminal 2 according to the present embodiment, when digitizing the added manuscript, it is possible for a user to edit the handwritten characters into desired character data.

It should be noted that, in the present embodiment, the added manuscript is used as a manuscript in which printed characters as document characters have been printed beforehand, and, after the printed characters have been printed, added characters as handwritten characters are added. And, the digitized data of the added manuscript are used as read image data which are created by optically reading the printed characters which have been printed on the manuscript beforehand and the added characters which are added after the printed characters have been printed. Therefore, in the present embodiment, character data corresponding to the document characters are used as printed character data. Furthermore, character data corresponding to the handwritten characters are used as added character data, edit information for editing the handwritten texts is used as added character data edit information, and edit information for editing the document texts is used as printed character data edit information. Also, in the present embodiment, a text edit screen functions as an input screen, a liquid crystal display 202 functions as a display screen, and edit screen display information is used as input screen display information.

Figure 5:
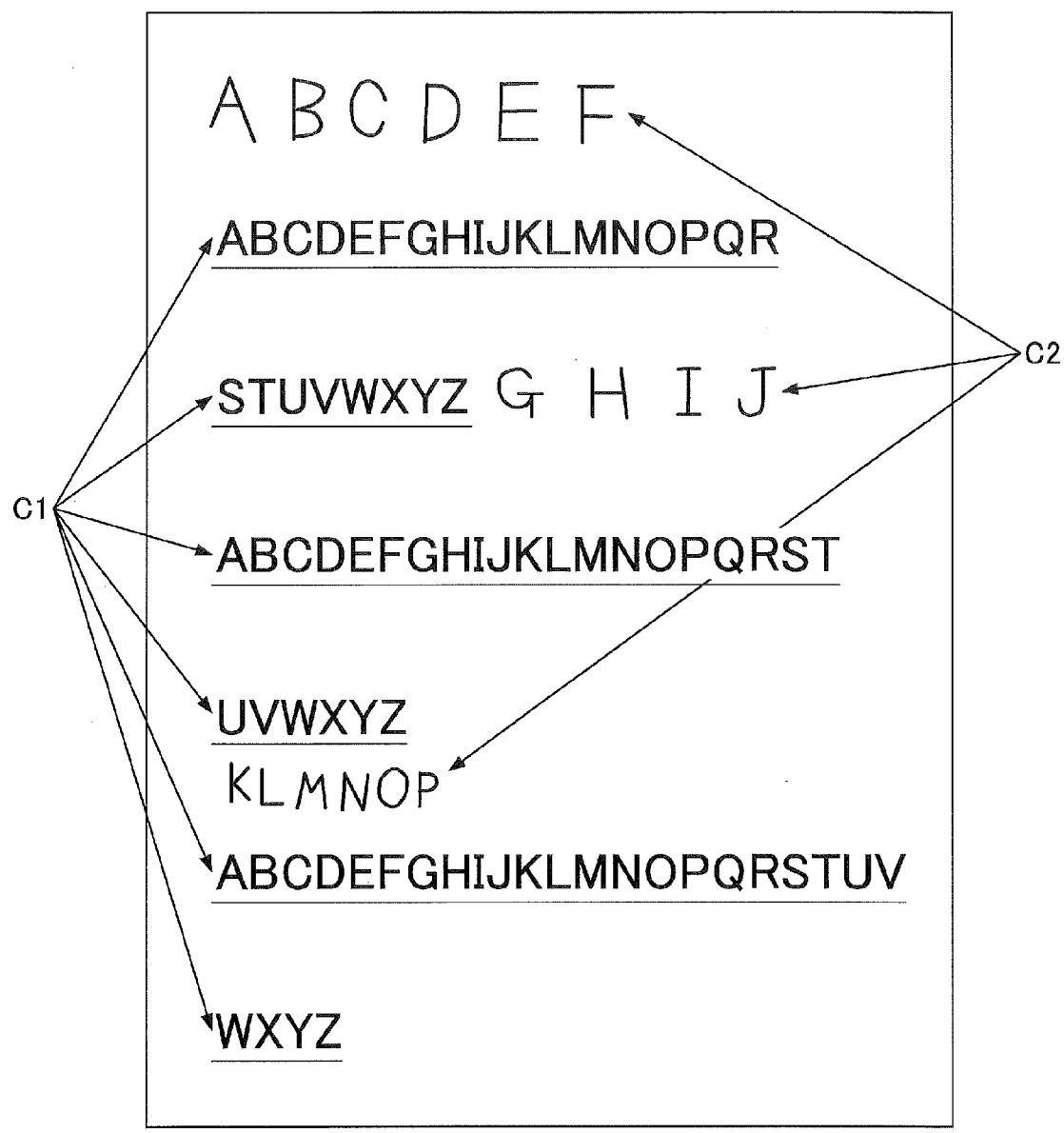
FIG. 5 is a drawing illustrating an example of an added manuscript which is ready to be digitized by an image forming apparatus according to an embodiment of the present invention.

Next, referring to FIG. 5, an added manuscript which is ready to be digitized by the image forming apparatus 1 according to the present embodiment will be described. In other words, FIG. 5 is a drawing illustrating an example of an added manuscript which is ready to be digitized by the image forming apparatus 1 according to the present embodiment. Specifically, for example, as shown in FIG. 5, the added manuscript which is ready to be digitized by the image forming apparatus 1 includes a mix of document characters C1 and handwritten characters C2. In this way, the added manuscript has a bad appearance in which difference between the characters printed beforehand and the handwritten characters added afterwards stands out.

Figure 6:
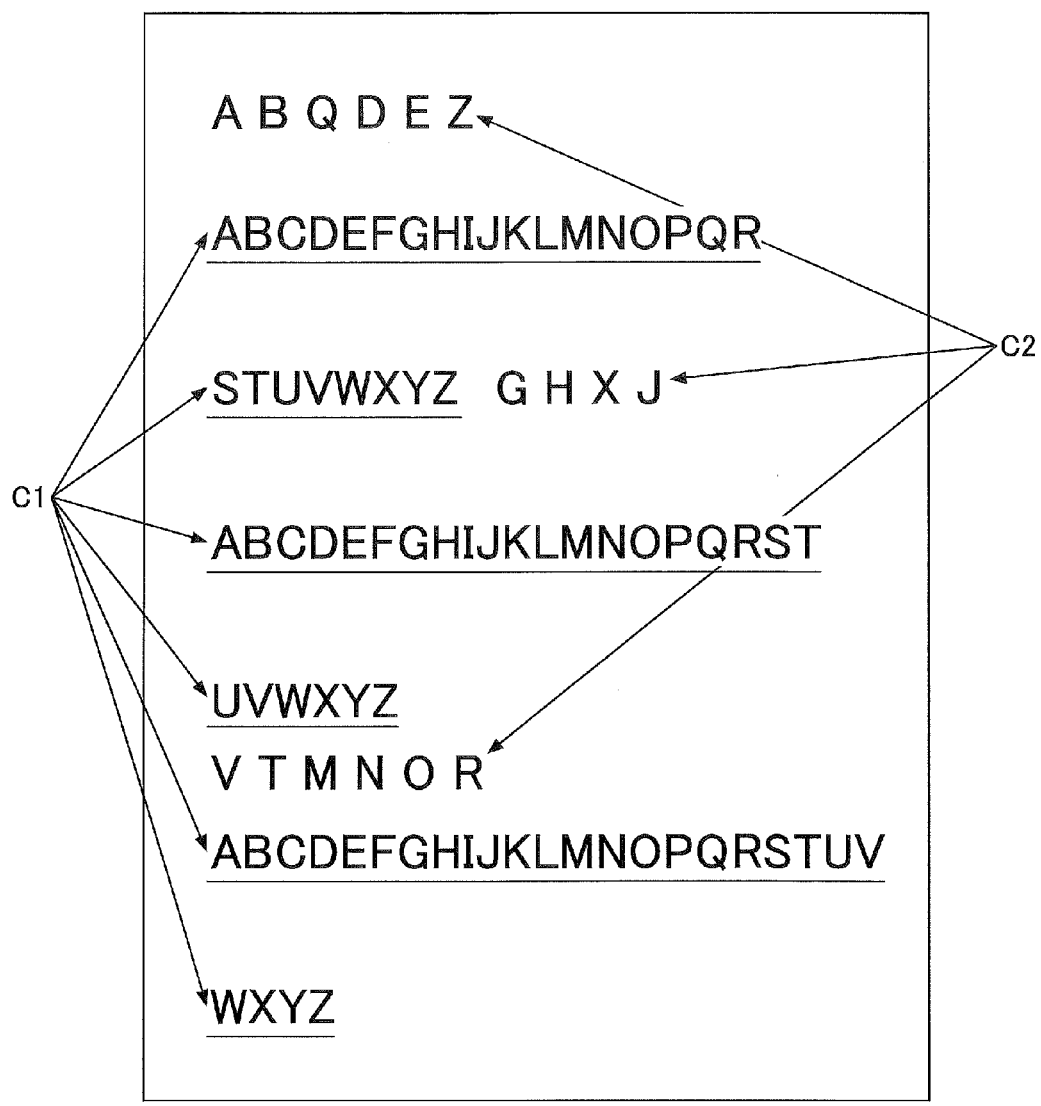
FIG. 6 is a drawing illustrating an image of an example of a result in which characters included in image data which are digitized data of the added manuscript are converted to character data by a client terminal according to an embodiment of the present invention by using OCR.

Therefore, the client terminal 2 according to the present embodiment converts characters included in the image data which are digitized data of the added manuscript to character data whose format can be processed by an information processing apparatus, by using OCR. An example of the conversion result at this point is shown in FIG. 6. In other words, FIG. 6 is a drawing illustrating an image of an example of a result in which characters included in the image data which are digitized data of the added manuscript have been converted to character data by the client terminal 2 according to the present embodiment by using the OCR.

As shown in FIG. 6, the bad appearance due to the difference between the document characters C1 and the handwritten characters C2 has disappeared as a result of conversion in which characters included in the image data which are digitized data of the added manuscript are converted to character data by the client terminal 2 according to the present embodiment by using the OCR. However, some of the handwritten texts have been incorrectly converted.

Therefore, the client terminal 2 according to the present embodiment is configured to display on the liquid crystal display 202 a text edit screen which is an interface for a user to edit the handwritten texts. A display example of the text edit screen at this point is shown in FIG. 7. In other words, FIG. 7 is a drawing illustrating a display example of a text edit screen according to the present embodiment.

As shown in FIG. 7, in the text edit screen according to the present embodiment, a preview screen of the digitized data of the added manuscript to which an OCR converting process has been applied is displayed. Subsequently, the user, by selecting an area surrounded by a dotted line in this preview screen, can edit the handwritten texts. At this time, the user can also edit font, font size, font color, character orientation, with/without frame line, frame line color, frame line style such as solid-line or dotted-line, character style such as bold or underline, background color, or the like. Also, other than the above, the user can change positions of handwritten texts and sizes of frames. In this way, in the client terminal 2 according to the present embodiment, it is possible to edit characters, character types, character size, character color, character position, character orientation, background color of a predefined area including the added character data, and frame line surrounding the predetermined area.

Figure 8:
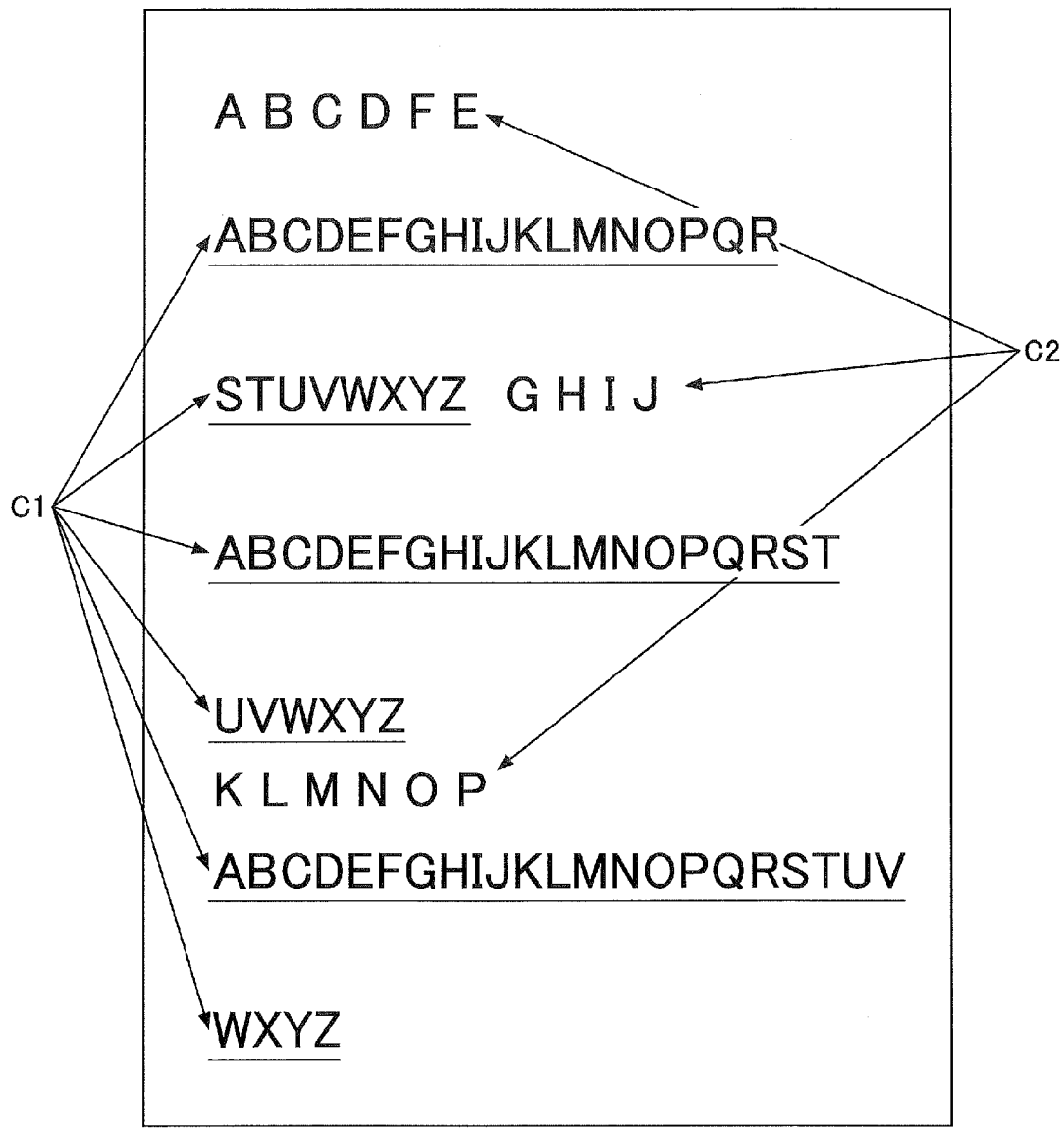
FIG. 8 is a drawing illustrating an example of a result in which handwritten texts have been edited by a client terminal according to an embodiment of the present invention.

An example result in which the character data of the handwritten characters are edited as described above is shown in FIG. 8. In other words, FIG. 8 is a drawing illustrating an example of a result in which handwritten texts are edited by the client terminal 2 according to the present embodiment. As shown in FIG. 8, the appearance of the added manuscript is improved because the handwritten characters C2 are added without a feeling of strangeness as a result of the handwritten texts being edited by the image forming apparatus 1 according to the edit information input by the user via the keyboard/mouse 201.

Furthermore, the handwritten characters are not incorrectly converted any more and are converted to character data as the user wants as a result of the handwritten texts being edited by the image forming apparatus 1 according to the edit information input by the user via the keyboard/mouse 201.

As described above, the client terminal 2 according to the present embodiment is configured in such a way that the user can freely edit the handwritten texts. Therefore, according to the client terminal 2 of the present embodiment, even in the case where handwritten characters are incorrectly converted by an OCR process, it is possible for a user to freely edit the incorrectly converted handwritten texts. Therefore, in the client terminal 2 according to the present embodiment, when digitizing the added manuscript, it is possible for a user to edit the handwritten characters to desired character data.

Next, referring to FIG. 9, an example of a process of the client terminal 2 according to the present embodiment for digitizing the added manuscript will be described. In other words, FIG. 9 is a flowchart of a process when an added manuscript is digitized by the client terminal 2 according to the present embodiment.

Figure 9:
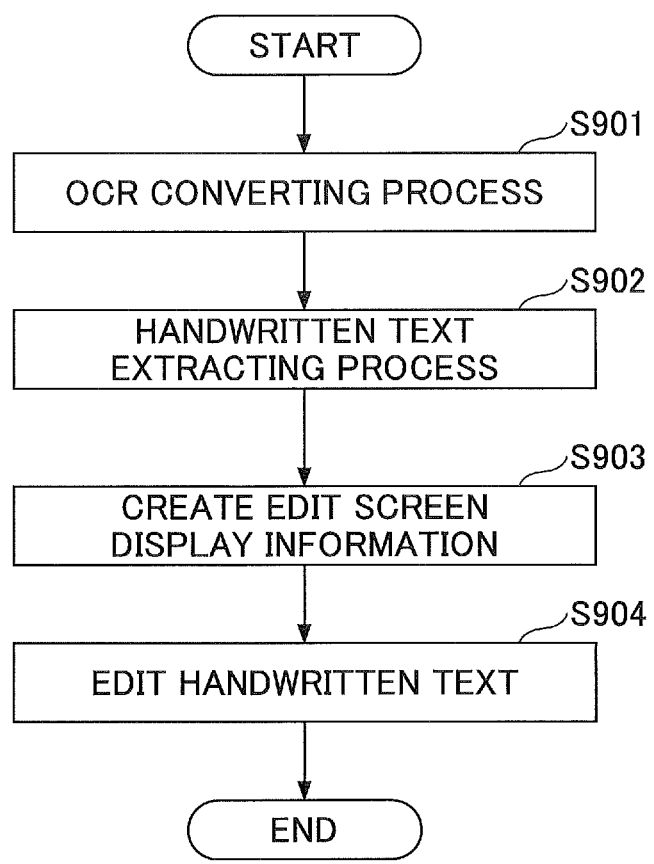
FIG. 9 is a flowchart for describing an example of a process when an added manuscript is digitized by a client terminal according to an embodiment of the present invention.

As shown in FIG. 9, when the client terminal 2 according to the present embodiment digitizes an added manuscript, first, the OCR converting unit 220, according to the control of the main control unit 210, applies an OCR converting process to image data (S901). It should be noted that the image data are digitized data of the manuscript created by the image forming apparatus 1 by reading the manuscript. In other words, in the present embodiment, an OCR converting process performed in S901 is, for example, performed as a data converting step.

A handwritten text extracting unit 230 performs, according to the control of the main control unit 210, a handwritten text extracting process for the digitized data for which the OCR converting process has been performed in S901 (S902). In other words, in the present embodiment, a text extracting process performed in S902 is, for example, performed as a character data distinguishing step.

The display information creating unit 240, according to the control of the main control unit 210, based on the extraction result in S902, creates edit screen display information (S903). In other words, in the present embodiment, an edit screen display information creating process performed in S903 is, for example, performed as an input screen display information creating step.

The text editing unit 250, according to the control of the main control unit 210, accepts edit information input via the keyboard/mouse 201 in the edit screen display information created in S903. Then, the text editing unit 250, according to the accepted edit information, performs a text edit process for the digitized data for which the OCR converting process has been performed in S901 (S904). In other words, an edit information accepting process performed in S904 is, for example, performed as an edit information accepting step, and a text edit process is performed as a character data edit step. It should be noted that, at this time, it is possible for the text editing unit 250 to distinguish each of the handwritten texts, and, according to the edit information related to each of the handwritten texts input via the keyboard/mouse 201, edit each of the handwritten texts separately.

Figure 10:
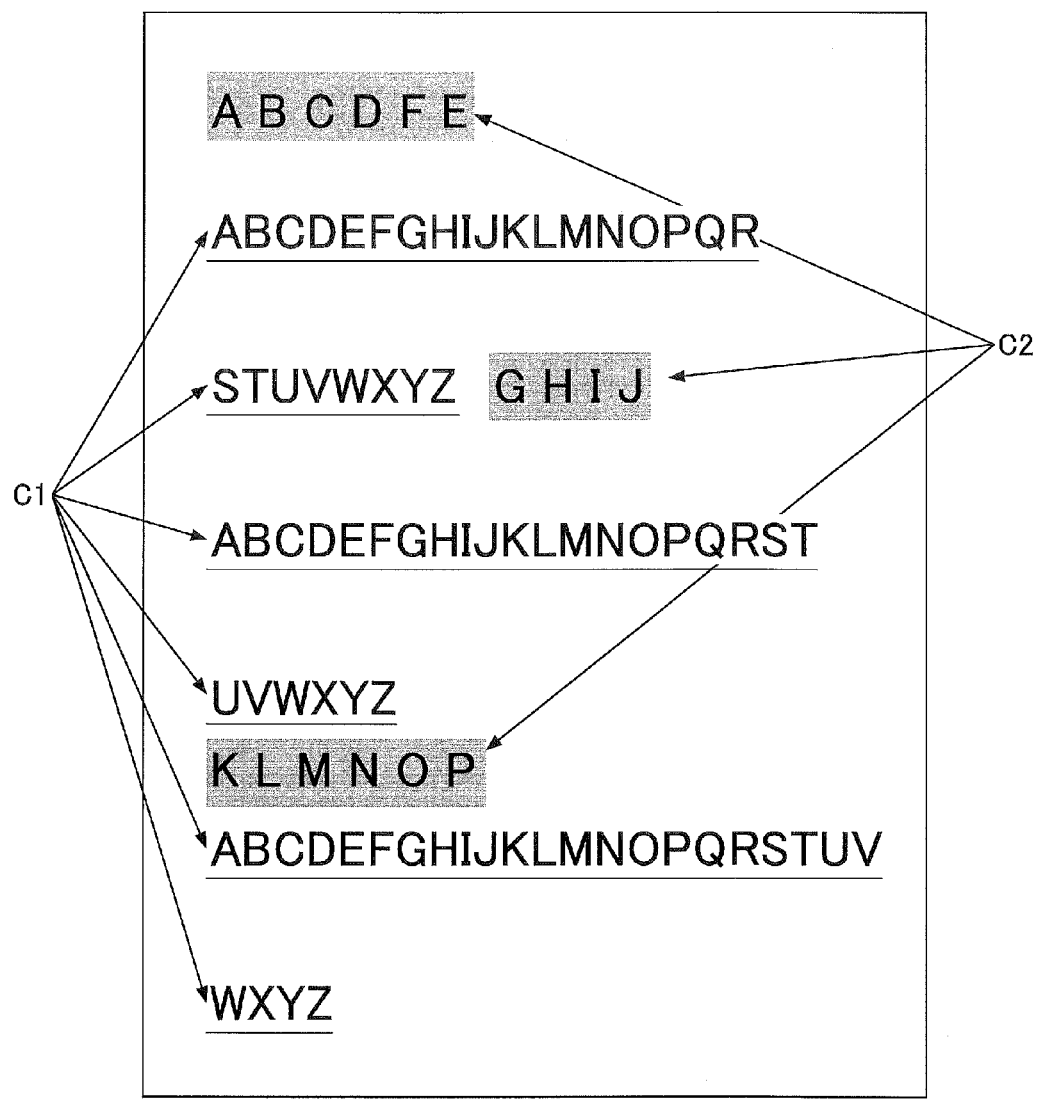
FIG. 10 is a drawing illustrating an example of a result in which handwritten texts have been edited by a client terminal according to an embodiment of the present invention.

An example result in which the character data of the handwritten characters are edited in this way is shown in FIG. 10. In other words, FIG. 10 is a drawing illustrating an example of a result in which handwritten texts are edited by the client terminal 2 according to the present embodiment. It should be noted that FIG. 10 shows an example in which background colors of the handwritten texts of the original manuscript have been edited to different colors.

As shown in FIG. 10, the image forming apparatus 1 according to the present embodiment, according to the edit information input by a user via the keyboard/mouse 201, edits the handwritten texts. As a result of the editing, the handwritten texts are highlighted so that it is possible to allow the user to recognize that those texts were originally handwritten texts.

Figure 11:
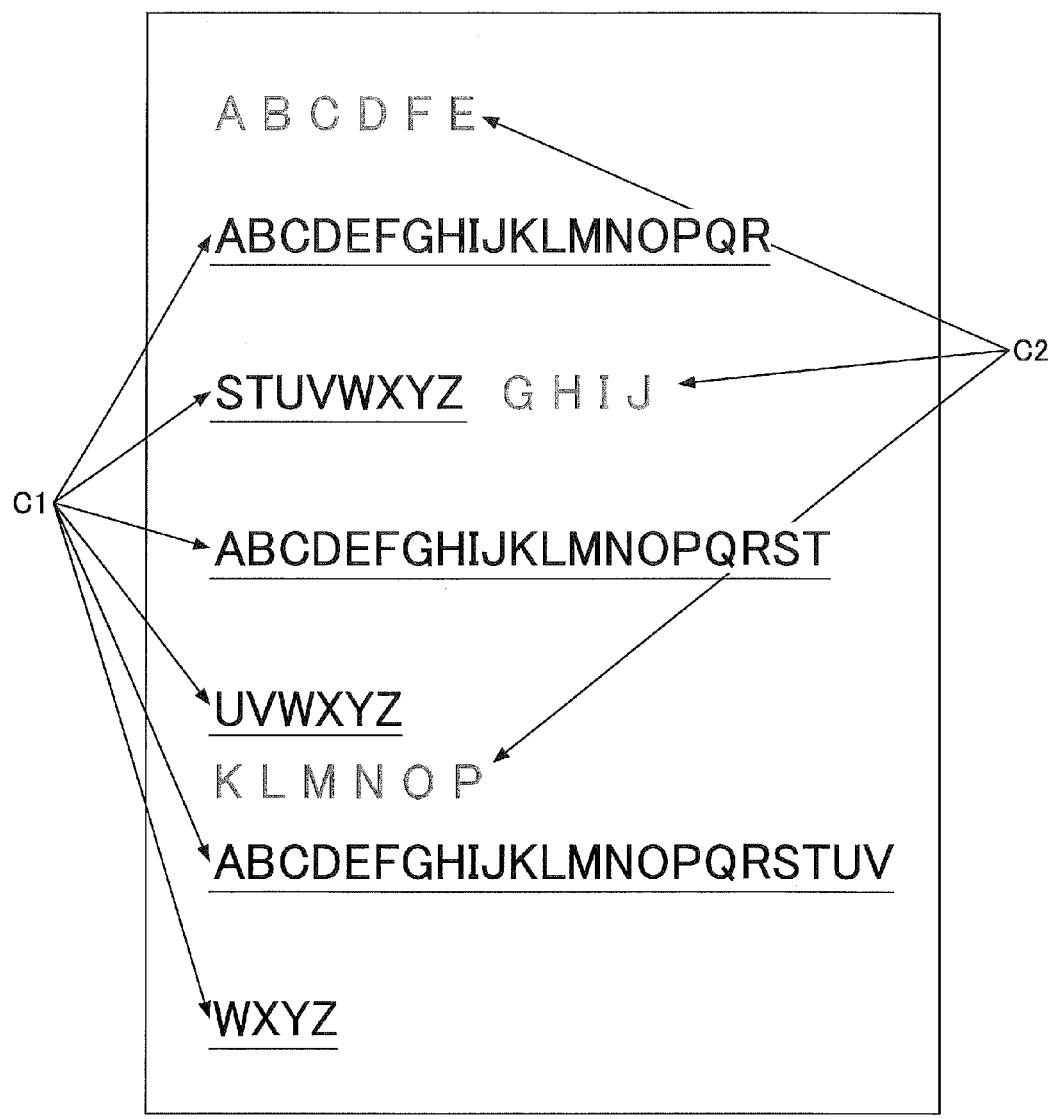
FIG. 11 is a drawing illustrating an example of a result in which handwritten texts have been edited by a client terminal according to an embodiment of the present invention.

Also, an example result in which the character data of the handwritten characters are edited in this way is shown in FIG. 11. In other words, FIG. 11 is a drawing illustrating an example of a result in which handwritten texts are edited by the client terminal 2 according to the present embodiment. It should be noted that FIG. 11 shows an example in which colors of the handwritten texts have been edited to be fainter than the colors of the character data corresponding to the document characters.

As shown in FIG. 11, the image forming apparatus 1 according to the present embodiment, according to the edit information input by a user via the keyboard/mouse 201, edits the handwritten texts. As a result of the editing, it is possible to make the handwritten texts obscure and, at the same time, to allow the user to recognize that those texts were originally handwritten texts.

As described above, the client terminal 2 according to the present embodiment is configured to extract handwritten texts from the digitized data of the added manuscript to which an OCR converting process has been applied, so that a user can freely edit the extracted handwritten texts. Therefore, according to the client terminal 2 of the present embodiment, even in the case where handwritten characters have been incorrectly converted by an OCR process, it is possible for a user to freely edit the incorrectly converted handwritten texts. Therefore, in the client terminal 2 according to the present embodiment, when digitizing the added manuscript, it is possible for a user to edit the handwritten characters to be desired character data.

It should be noted that the configuration of the client terminal 2 according to the present embodiment is not limited to a configuration in which the text edit screen is displayed on the liquid crystal display 202 and the handwritten texts are edited based on the edit information input in the text edit screen. For example, the client terminal 2 may be configured to edit the handwritten texts by using typical word-processing software.

Also, all or a part of each process may be implemented by a program to be executed by a computer described in a legacy programming language or an object-oriented programming language such as Assembler, C, C++, C#, or Java (registered trademark). In other words, the program is a computer program which causes a computer such as an information processing apparatus to perform each process.

Also, the program may be stored in a computer readable storage medium such as a ROM or an EEPROM (Electrically Erasable Programmable ROM) and may be distributed. Further, the storage medium may be an EPROM (Erasable Programmable ROM), a flash memory, a flexible disk, a CD-ROM, a CD-RW, a DVD-ROM, a DVD-RAM, a DVD-RW, a Blu-ray disc, an SD (registered trademark) card, an MO, or the like. Furthermore, the program may be distributed through telecommunication lines.

As described above, preferable embodiments of the present invention have been described. The present invention is not limited to the specific embodiments and various variations and modifications can be made within the scope of the present invention described in the claim.

The present invention is not limited to the specifically disclosed embodiments, and variations and modifications may be made without departing from the scope of the present invention.

What is claimed is:

1. An information processing apparatus for converting image data created from an optically read manuscript to character data, the information processing apparatus comprising:
   a data converting unit configured to convert the image data of a printed character printed beforehand on the manuscript and an added character added after the printed character has been printed to the character data;
   a character data distinguishing unit configured to distinguish, of the converted character data, between printed character data which are the character data converted from the image data corresponding to the printed character and added character data which are the character data converted from the image data corresponding to the added character,
   wherein the character data distinguishing unit, in an Optical Character Recognition (OCR) converting process, extracts characters whose recognition rate is less than a predetermined value as the added character data, and extracts characters whose recognition rate is equal to or greater than the predetermined value as the printed character data;
   an edit information accepting unit configured to accept added character data edit information for editing the distinguished added character data; and
   a character data edit unit configured to, according to the accepted added character data edit information, edit the distinguished added character data.

2. The information processing apparatus according to claim 1, wherein
   the edit information accepting unit accepts, for each of items of the converted added character data, the added character data edit information, and
   the character data edit unit edits, according to the added character data edit information accepted for each of the items of the converted added character data, the respective items of the converted added character data.

3. The information processing apparatus according to claim 1, further comprising:
   an input screen display information creating unit configured to create input screen display information for displaying an input screen for inputting the added character data edit information for editing the converted added character data, wherein
   the edit information accepting unit accepts the added character data edit information input in the input screen.

4. The information processing apparatus according to claim 1, wherein
   the character data edit unit edits at least any one of a character, a character type, a character color, a character position, a character orientation, a background color of a predetermined area including the added character data, and a frame line surrounding the predetermined area in the added character data.

5. An information processing method of an information processing apparatus for converting image data created from an optically read manuscript to character data, the information processing method comprising:
   a data converting step of converting, by the information processing apparatus, the image data of a printed character printed beforehand on the manuscript and an added character added after the printed character has been printed to the character data;
   a character data distinguishing step of distinguishing, by the information processing apparatus, of the converted character data, between printed character data which are the character data converted from the image data corresponding to the printed character and added character data which are the character data converted from the image data corresponding to the added character,
   wherein the character data distinguishing unit, in an Optical Character Recognition (OCR) converting process, extracts characters whose recognition rate is less than a predetermined value as the added character data, and extracts characters whose recognition rate is equal to or greater than the predetermined value as the printed character data;
   an edit information accepting step of accepting, by the information processing apparatus, added character data edit information for editing the distinguished added character data; and
   a character data editing step of editing, according to the accepted added character data edit information, the distinguished added character data.

6. A non-transitory computer-readable recording medium having a program stored therein that causes a computer to execute a method for converting image data created from an optically read manuscript to character data, the method comprising:
   a data converting step of converting, by the computer, the image data of a printed character printed beforehand on the manuscript and an added character added after the printed character has been printed to the character data;
   a character data distinguishing step of distinguishing, by the computer, of the converted character data, between printed character data which are the character data converted from the image data corresponding to the printed character and added character data which are the character data converted from the image data corresponding to the added character, wherein the character data distinguishing step, in an Optical Character Recognition (OCR) converting process, extracts characters whose recognition rate is less than a predetermined value as the added character data, and extracts characters whose recognition rate is equal to or greater than the predetermined value as the printed character data;
   an edit information accepting step of accepting, by the computer, added character data edit information for editing the distinguished added character data; and
   a character data editing step of editing, by the computer, according to the accepted added character data edit information, the distinguished added character data.

* * * * *